US007921700B2

(12) United States Patent
Raichle et al.

(10) Patent No.: US 7,921,700 B2
(45) Date of Patent: Apr. 12, 2011

(54) METHOD FOR DETERMINING CYLINDER-SPECIFIC COMBUSTION FEATURES OF AN INTERNAL COMBUSTION ENGINE

(75) Inventors: Franz Raichle, Korntal-Muenchingen (DE); Peter Skala, Tamm (DE); Andreas Rupp, Marbach (DE); Wolfgang Fischer, Gerlingen (DE); Michael Kessler, Weissach (DE); Mohamed Youssef, Nufringen (DE); Joerg Breuninger, Hemmingen (DE); Haris Hamedovic, Schwieberdingen (DE); Axel Loeffler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 11/983,489

(22) Filed: Nov. 8, 2007

(65) Prior Publication Data

US 2008/0148826 A1 Jun. 26, 2008

(30) Foreign Application Priority Data

Nov. 30, 2006 (DE) ......................... 10 2006 056 708

(51) Int. Cl.
*G01M 15/06* (2006.01)

(52) U.S. Cl. ..................................................... 73/114.27

(58) Field of Classification Search ............... 73/114.15, 73/114.25–114.28; 701/102, 107, 114; 123/435
See application file for complete search history.

(56) References Cited

U.S. PATENT DOCUMENTS

| | | | | |
|---|---|---|---|---|
| 5,056,487 | A * | 10/1991 | Yamakado et al. | 123/436 |
| 5,611,311 | A * | 3/1997 | Tomisawa | 123/406.47 |
| 7,404,391 | B2 * | 7/2008 | Schueler et al. | 123/406.24 |
| 7,415,351 | B2 * | 8/2008 | Raichle et al. | 701/114 |
| 2006/0259229 | A1 * | 11/2006 | Raichle | 701/114 |
| 2007/0137617 | A1 * | 6/2007 | Schueler et al. | 123/406.24 |
| 2007/0261669 | A1 * | 11/2007 | Buslepp et al. | 123/406.24 |

FOREIGN PATENT DOCUMENTS

| | | |
|---|---|---|
| DE | 197 49 817 | 5/1999 |
| DE | 102 18 736 | 11/2003 |
| DE | 102 27 279 | 1/2004 |

* cited by examiner

*Primary Examiner* — Freddie Kirkland, III
(74) *Attorney, Agent, or Firm* — Kenyon & Kenyon LLP

(57) ABSTRACT

A method for determining cylinder-specific combustion features of an internal combustion engine, the cylinder-specific combustion features being ascertained from a variable which represents the crankshaft speed, especially being ascertained from a signal of a crankshaft sensor or camshaft sensor. The cylinder-specific combustion features include a combustion position of at least one cylinder and/or a torque of the crankshaft.

24 Claims, 3 Drawing Sheets

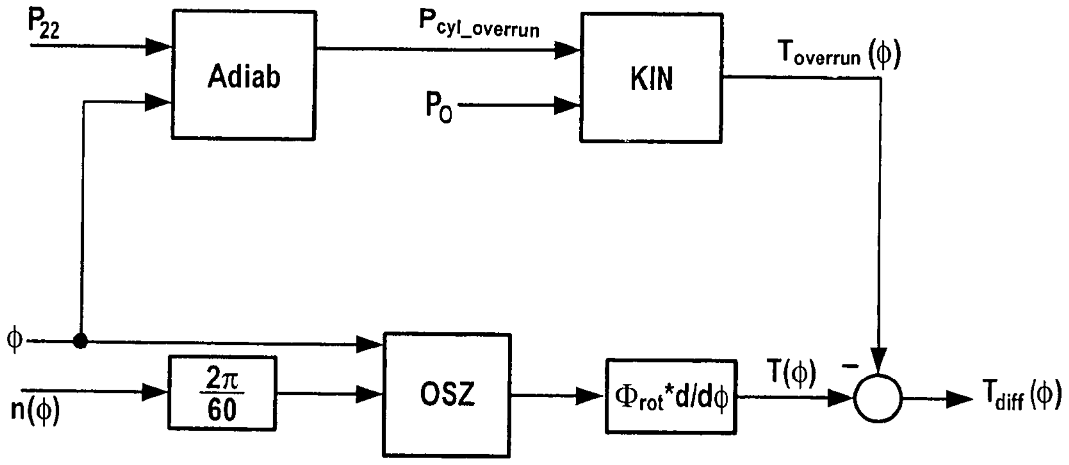
Fig. 1
Fig. 2
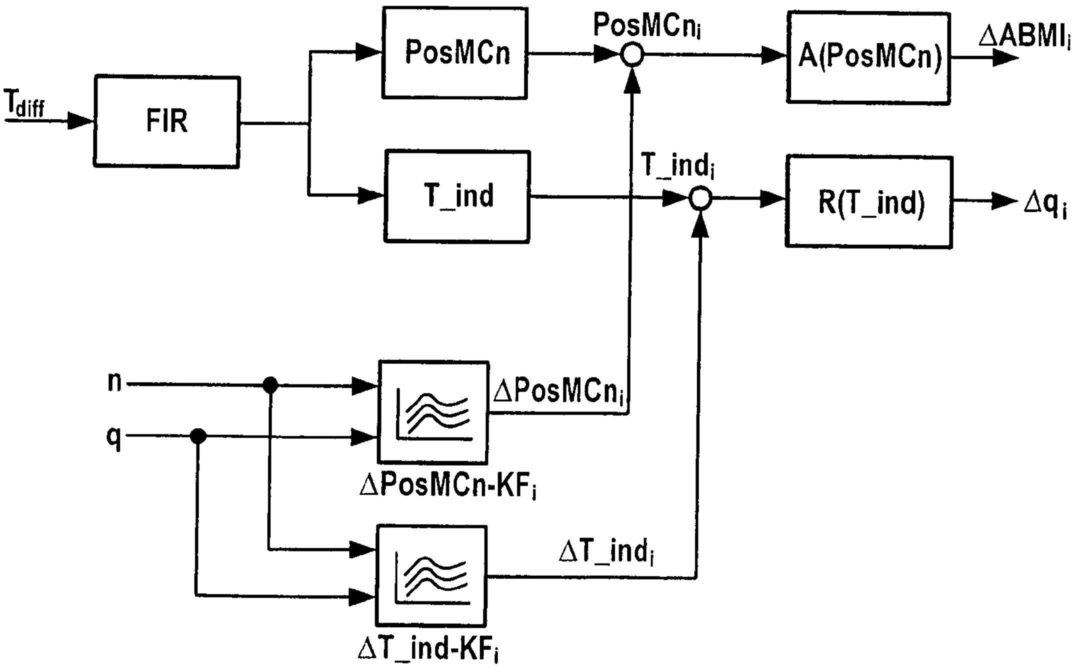

METHOD FOR DETERMINING CYLINDER-SPECIFIC COMBUSTION FEATURES OF AN INTERNAL COMBUSTION ENGINE

FIELD OF THE INVENTION

The present invention relates to a method, a device, an internal combustion engine and a computer program for determining cylinder-specific combustion features of an internal combustion engine.

BACKGROUND INFORMATION

Increasing demands (e.g., US07, Euro5) on modern diesel engines with respect to their emissions, in addition to requiring new systems for exhaust-gas treatment, also require the development of new combustion processes for reducing emissions within the engine. So-called (partial-) homogeneous combustion processes (also known as (p)HCCI processes) represent one potential possibility in this regard. One characteristic these processes share in common is a sharply increased exhaust-gas recirculation (EGR) rate compared to conventional combustion processes. For design reasons, already during steady-state operation, this leads to different filling compositions (ratio of inert gas/fresh air) specific to each cylinder, and as a result of manufacturing tolerances and aging effects of the engine over its service life, leads both to combustions proceeding very differently specific to each cylinder, and to sharp sample strews. This, in turn, leads to very different pollutant and noise emissions specific to each cylinder, which is unwanted.

On the other hand, combustions proceeding differently specific to each cylinder can be detected by ascertaining the combustion position and the mean indicated torque, and adjusted, if necessary. In this respect, ascertaining and controlling these combustion parameters for equalizing the cylinders represents one possibility for improving the combustion.

There are conventional methods for determining cylinder-specific combustion features from the cylinder-pressure signal and the structure-borne sound signal, which are used in particular for combustion processes having a high EGR rate (e.g., pHCCI combustion processes).

In principle, the combustion position can be determined robustly by cylinder-pressure indication; however, the additional costs for the production use of cylinder-pressure sensors are so high that, particularly in the case of smaller engines (e.g., 4 cylinder) and high piece numbers, they must be judged as critical. Therefore, an object of the present invention is to ascertain cylinder-specific combustion features in a manner that is more cost-effective than in methods heretofore.

SUMMARY

This object may be achieved by a method, a device, an internal combustion engine and a computer program according to example embodiments of the present inventions.

In particular, the objective may be achieved by an example method for determining cylinder-specific combustion features of an internal combustion engine, the cylinder-specific combustion features being ascertained from a variable which represents the crankshaft speed, in particular from a signal of a crankshaft sensor or camshaft sensor, the cylinder-specific combustion features including a combustion position of at least one cylinder and/or a torque of the crankshaft. The combustion position is an angle denoting the instant of the combustion. In internal combustion engines having cylinder-pressure measurement, the combustion position denotes the crankshaft angle at which 50% of the total quantity of heat is converted upon combustion of the gas/air mixture in the cylinder. For internal combustion engines in which only rotational speed and rotational angle can be measured, a feature equivalent thereto is used. Both features are not physically identical; for internal combustion engines in which only the rotational speed or the crankshaft angle is evaluated, only the mechanical work can be taken into account. If the cylinder pressure is measured, then it is also possible to determine the inner energy of the gas mixture contained in the cylinder.

Preferably, it is provided that the torque is a mean indicated torque over an angular range of the crankshaft angle. The combustion position is preferably ascertained as the centroid of a differential gas-torque curve determined over an angular range of the crankshaft angle.

Preferably, the differential gas-torque curve is ascertained from the difference between a gas-torque curve and an overrun-torque curve.

Preferably, the overrun gas-torque curve is ascertained from a model of the internal combustion engine with the aid of a function, into which are entered at least a charge-air pressure, an ambient pressure, a wall-heat loss and a gas composition in the cylinders. The overrun gas-torque curve is preferably stored as a program map. The gas-torque curve is preferably ascertained from a total moment of rotational inertia of the crankshaft and a corrected angular speed of the crankshaft.

Preferably, it is provided that the parameters which are utilized for determining the gas-torque curve and/or overrun gas-torque curve are adapted based on a deviation of the gas-torque curve and/or overrun gas-torque curve of one cylinder—which is provided with a device for measuring the cylinder pressure—from a gas-torque curve and/or overrun gas-torque curve that was ascertained with the help of the measured cylinder pressure. Preferably, it is further provided that the parameters include a charge-air pressure and/or an ambient pressure and/or a wall-heat loss and/or a gas composition in the cylinders. The adaptation is preferably carried out using an error-minimization method, e.g., a least square method. Preferably, the combustion position and/or the mean indicated torque of the cylinder having the device for measuring the cylinder pressure is/are checked for plausibility with the aid of the measured cylinder pressure.

Preferably, a reference gas-torque curve is obtained from the measured cylinder pressure, and differences in the combustion positions of the remaining cylinders with respect to the cylinder having the device for measuring the cylinder pressure are determined by cross-correlation of the gas-torque curves, determined individually for each cylinder, with the reference gas-torque curve. Preferably, it is provided that the cylinder-specific combustion features are the actual values of a controller for controlling the position of the injection and the total fuel quantity of one cylinder of an internal combustion engine.

The objective may also be achieved by a device, especially a control unit for an internal combustion engine, having an arrangement for determining cylinder-specific combustion features of an internal combustion engine, the cylinder-specific combustion features being ascertained from a variable that represents the crankshaft speed, in particular being ascertained from a signal of a crankshaft sensor or camshaft sensor, characterized in that the cylinder-specific combustion features include a combustion position of one cylinder and/or a torque of the crankshaft.

The objective may also be achieved by an internal combustion engine having an arrangement for determining cylinder-specific combustion features of an internal combustion engine, the cylinder-specific combustion features being ascertained from a variable that represents the crankshaft speed, in particular being ascertained from a signal of a crankshaft sensor or camshaft sensor, characterized in that the cylinder-specific combustion features include a combustion position of one cylinder and/or a torque of the crankshaft. Preferably, at least one cylinder is provided with a device for measuring the cylinder pressure. It is further provided that the device for measuring the cylinder pressure preferably generates a signal that represents the cylinder pressure over time or over the crankshaft angle.

The objective may also be achieved by a computer program having program code for carrying out all steps according to a method of the present invention when the program is executed in a computer.

According to example embodiments of the present invention, a method is provided to obtain cylinder-specific features with respect to the combustion from a speed signal, and subsequently to use them for the closed-loop or optimized open-loop control of the combustion process. The speed signal is subject to various cross influences which must be eliminated first before information relevant to the combustion can be extracted from the signal curve. Thus, it is necessary to compensate for the influence of the dragged engine, taking into account the instantaneous charge-air pressure, the influence of the so-called oscillating masses (piston mass and proportional connecting-rod mass) and the influence of the crankshaft torsion. The compensation of these cross influences allows the calculation of a reconstructed gas-torque curve of the combustion (also known as differential torque curve), based on which, features regarding the combustion position as well as the mean indicated torque may be obtained.

Moreover, if the internal combustion engine has an indicated cylinder (a so-called guide cylinder), then the measured pressure signal may be used to compensate for the cross influence. Furthermore, the combustion features on the basis of the guide cylinder may be used for checking the plausibility of those obtained on the basis of speed. Finally, in the case of the transient stabilization of the combustion (e.g., in the case of sudden load changes), an absolute value on the basis of the guide cylinder is already sufficient, since, for example, misfirings or noise peaks are essentially caused by the slower dynamics of the air system compared to the injection system, and therefore are not cylinder-specific in nature. According to example embodiments of the present invention, cylinder-specific features are estimated with respect to the combustion position by joint evaluation of the speed signal and the combustion-chamber pressure of one or more indicated cylinders, and these are features subsequently used for the closed-loop or optimized open-loop control of the combustion process individually for each cylinder.

In comparison to a full indication of cylinder pressure (i.e., a pressure sensor in each cylinder), the example method of the present invention having one indicated cylinder is more cost-effective because of the reduced number of pressure sensors (speed signal is available in any case) and is more easily realizable from a standpoint of design engineering.

The purely speed-based method for controlling the combustion position may be suitable for equalization of the cylinders. Here, the problem occurs that the absolute values of the combustion-position feature are strongly speed-dependent and load-dependent, and are significantly influenced by further cross influences such as errors in estimating the compression torque from an incorrectly measured charge-air pressure. In the example method of the present invention using a guide cylinder, the compression torque as well as the absolute value of the combustion position are advantageously determined based on the available combustion-chamber pressure signal, which has a significant effect on the accuracy. A further advantage of the example method is the possibility of compensating for various sensor errors like, for example, pulse-generating-wheel errors, with the help of the available pressure signal.

Based on the calculated combustion features, with the aid of an adaptation or control strategy, interventions may be carried out in the injection system that may be either of a relative nature (steady-state equalization of the combustion position and/or mean indicated torque), or of an absolute nature (e.g., regulated guidance of the average value of the combustion position in response to a sudden change in load).

BRIEF DESCRIPTION OF THE DRAWINGS

An exemplary embodiment of the present invention is explained in detail below with reference to the accompanying figures.

FIG. 1 shows a flow chart of an exemplary embodiment of a first part of a method according to the present invention.

FIG. 2 shows a flow chart of an exemplary embodiment of a second part of a method according to the present invention.

DETAILED DESCRIPTION OF EXAMPLE EMBODIMENTS

Figure 3:
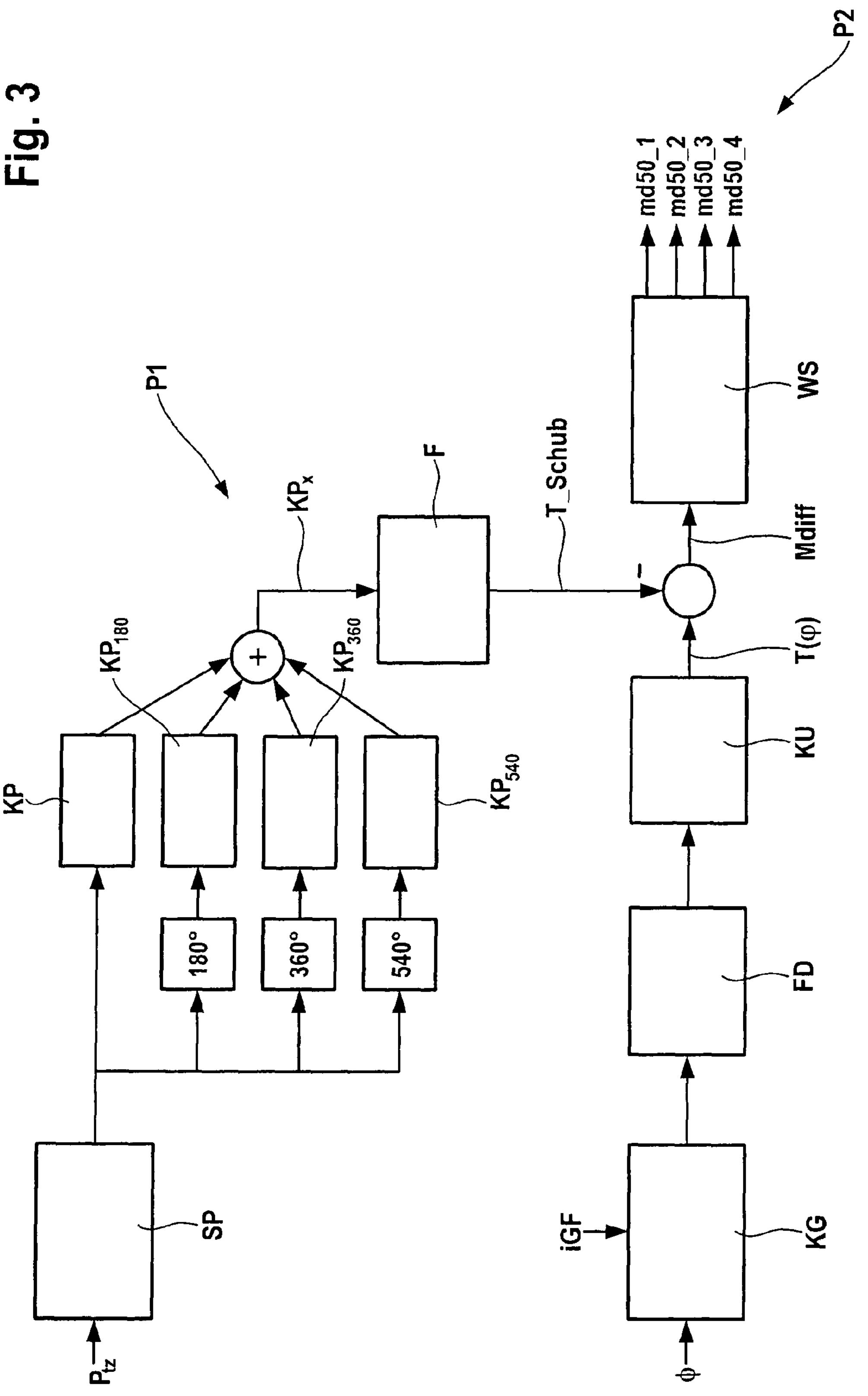
FIG. 3 shows a sketch of an internal combustion engine with indicated cylinder.

In the following, the ascertainment, according to an example embodiment of the present invention, of combustion position PosMCn and of mean indicated torque T_ind is first of all explained with reference to the block diagram of FIG. 1. Subsequently, an alternative specific embodiment of the method according to the present invention is described, should one of the cylinders having a cylinder pressure sensor be indicated. Finally, exemplary embodiments are described for the control or adaptation on the basis of the ascertained variables.

FIG. 1 describes the part of the method up to the determination of a differential gas-torque curve T_Diff($\phi$) corresponding to the combustion. In a module OSZ, angular speed $\dot{\phi}$ is subjected to a non-linear transformation which compensates for the influence of the oscillating masses of the internal combustion engine. After differentiation of corrected angular speed $\dot{\phi}$ and multiplication by total moment of rotational inertia $\Theta_{rot}$ of the crankshaft, one obtains gas-torque curve T($\phi$) of the engine operating.

Parallel thereto, in module Adiab, an adiabatic overrun-pressure curve is calculated from a measurement of charge-air pressure p22 and ambient pressure p0, as well as instantaneous crankshaft angle $\phi$. Wall-heat losses as well as gas composition dependent on the operating mode and operating point are taken into account via the adiabatic exponent kappa and the thermodynamic loss angle. The parameter kappa and the thermodynamic loss angle are drawn out in experiment and set down in program maps. With the aid of kinematic equations KIN of the internal combustion engine, into which are entered ambient pressure $p_0$ as well as cylinder overrun pressure $p_{cyl\_overrun}$, an overrun gas-torque curve T_overrun (ϕ) is obtained from the overrun pressure curve. Furthermore, changes in the ambient parameters such as the engine temperature or coolant temperature must be taken into account by corrections.

As an alternative to the model-based approach, the possibility also exists to directly store the extended overrun curves—preferably overrun gas-torque curve T_overrun (ϕ)—as a function of the operating point, and to retrieve them in the evaluation phase. Corrections on the basis of the ambient parameters are taken into account here, as well.

Finally, one subtracts overrun gas-torque curve T_overrun (ϕ) from gas-torque curve T(ϕ) and obtains the differential gas-torque curve of the combustion T_Diff(ϕ). The effects of the dragged operation and of the charge-air pressure are thereby taken into account.

Alternatively, one may first subject the corrected angular speed to an FIR- or polynomial differential filter, and from this curve, in correct phase relation then subtract the overrun gas-torque curve which was filtered beforehand using an FIR- or polynomial low-pass filter of the same characteristics, (i.e., in particular the same cut-off frequency).

FIG. 2 illustrates the part of the method up to the calculation of combustion position PosMCn and mean indicated torque T_ind, including their use as actual values for a closed loop control. First of all, differential gas-torque curve T_Diff (ϕ) is low-pass filtered synchronously as to rotational speed. The cylinder-specific variables are obtained on the basis of differential gas-torque curve T_Diff(ϕ) thus filtered, certain evaluation intervals first of all having to be assigned to the individual cylinders as a function of the filter characteristics.

The angle at which percentage β of the torque is converted, (median: β=0.5) of filtered differential gas-torque curve T_Diff(ϕ) as well as the centroid of the filtered differential gas-torque curve, is used for calculating combustion position [PosMCn]. If filtered differential gas-torque curve T_Diff(ϕ) is integrated over the angular range from $\phi_1$ to $\phi_2$, mean indicated torque [T_ind] is obtained as final value of the integration in window $\phi_1$, $\phi_2$.

Further deterministic disturbances (residual influence of the torsion, certain sensor errors, etc.) are drawn out in experiment and are stored in cylinder-specific correction program maps over the operating point. These correction program maps may be omitted when using an absolute-value control and replaced by cylinder-specific setpoint-value program maps.

If an indicated (guide) cylinder is available, then from the corresponding cylinder-pressure curve in a crankshaft angle range that safely lies before the start of the combustion, important parameters [p22, p0, kappa] of the overrun model [block: "calculation of the adiabatic curves"] may be obtained with the aid of a least square method, without having to access stored characteristic values. This helps to improve the accuracy of the method.

Moreover, features concerning the combustion position (e.g., the MFB50: 50% conversion point) or the mean torque (e.g., mepHP: indicated mean effective pressure of the high-pressure loop) for the guide cylinder may be obtained directly from the cylinder pressure. They may be utilized in the following for checking the plausibility of the corresponding cylinder-specific features PosMCn and T_ind.

Finally, a reference gas-torque curve T_Ref(ϕ) may also be calculated from the guide cylinder directly via the kinematic equations. The relative phase differences, i.e., combustion-position differences, of the other cylinders may then be determined by cross-correlation of gas-torque curves Ti(ϕ) (i=1 . . . number of cylinders), ascertained individually for each cylinder from the speed, with T_Ref(ϕ). This method is particularly robust with respect to noise and needs no recursions whatsoever.

In the explanation of a closed loop control now following, it is assumed that information about (a) combustion position [PosMCn] and (b) mean indicated torque [T_ind] is available for each cylinder, regardless of which of the two above-described methods was used to obtain it.

A continuous control may be based either on absolute values or else on relative values of the two combustion features. In a control based on absolute values, the setpoint value is predefined for all cylinders as a function of the operating point and operating mode. In a relative control, on the other hand, the specific difference of the actual value of the feature with respect to the actual value of the feature averaged (over all cylinders) is regulated to zero. Both variants are possible.

The PosMCN controller acts correctively on the triggering start of the main injection (ΔABMI) individually for each cylinder. Alternatively, an intervention in the preinjection quantity (ΔqPI) is also possible. The T_ind controller acts correctively on the total fuel quantity (Δq) individually for each cylinder.

The adaptation concept differs from the continuous control in that the controllers are only activated during steady-state operation at specific operating points, and in response to specific ambient conditions (engine temperature, air pressure, etc.). The steady-state correction values (controller outputs) are acquired individually for each cylinder and stored in corresponding program maps. During normal, that is, unregulated operation, the control of the injection system is corrected as a function of the operating point with the aid of these program maps; in this case, the triggering start of the main injection ABMI (i.e., the PI quantity) and the total fuel quantity q.

FIG. 3 shows a block diagram of an exemplary embodiment of a method according to the present invention having an indicated cylinder, using a 4-cylinder internal combustion engine as an example. Speed signal n is measured with the aid of a pulse-generating wheel, mounted at the crankshaft, which has a specific number of increments. The individual increments are detected by a sensor. By measuring the time between two successive markings, one obtains the so-called tooth periods which are converted into corresponding speed values. As a rule, the pulse-generating wheels exhibit geometrical and mounting errors caused by tolerances. They cause a systematic error which substantially impairs further use of the speed signal or possibly even makes it unusable for certain functionalities. Therefore, identification and compensation of these errors may be important.

The fluctuations in the speed signal come about primarily due to the gas torque obtained by compression and combustion, and the oscillating masses of the internal combustion engine. The gas torque due to the combustion is decisive for estimating the combustion position. Therefore, it may be important to compensate for the remaining two influence variables. Moreover, torsion effects of the crankshaft likewise simulate cylinder-specific information; for this reason, compensation is made for them as well.

In upper path P1 of FIG. 3, the compression torque is estimated. From measured combustion-chamber pressure $p_{tz}$ of the indicated cylinder (guide cylinder), the curve of the compression pressure is estimated in module SP based on a model, e.g., via the adiabatic model. Through a corresponding phase shift by 180°, 360° and 540° of this curve, approximations $KP_{180}$, $KP_{360}$ and $KP_{540}$ are obtained for the compression-pressure curves of the non-indicated cylinders. Therefore, the torque curves resulting due to the compressions may be calculated via the physical equations of the crankshaft drive. Signal $KP_X$ thus obtained is filtered by the same low-pass filter F as the speed signal, and subsequently subtracted from gas-torque curve T(ϕ) ascertained in path P2. In particular, the low-pass filtering makes it possible to partially eliminate influences due to torsional vibrations on gas-torque curve T(ϕ). The curve of torque Mdiff developing due to the combustion is thereby obtained.

In lower path P2 in FIG. 3, speed signal ϕ is compensated in a module KG with respect to indicated pulse-generating-wheel errors IGF and subsequently filtered in a module FD and time-differentiated. In an adjacent module KU, oscillating masses MOSZ are compensated and the gas torque is estimated. In this way, gas-torque curve T(ϕ) is obtained. After subtracting overrun gas-torque curve T_overrun, which was ascertained in path P1, from gas-torque curve T(ϕ), differential gas-torque curve M_diff is obtained. If the angle-selective calculation of the 50% conversion points of differential gas-torque curve M_Diff follows in a module WS, one obtains the 50% conversion points MD50_1, MD50_2, MD50_3 and MD50_4 for each cylinder.

It is equivalent as far as form is concerned, but somewhat more efficient with respect to the calculating resources needed, not to perform the low-pass filtering for both paths individually, but only after the subtraction of the gas-torque curve in the dragged operation from the gas-torque curve in the engine operating state.

An associated angle segment is defined for each cylinder. In each angle segment, a position feature md50 based on torque curve Mdiff is calculated for each individual combustion. To that end, for example, it is possible to use the 50% conversion point of Mdiff (the angle at which the integral over Mdiff of the associated angle segment reaches 50% of the final value of the integral). Alternatively, other position features based on Mdiff may also be used. The cylinder-specific features md50 are used for controlling the combustion position.

Figure 4:
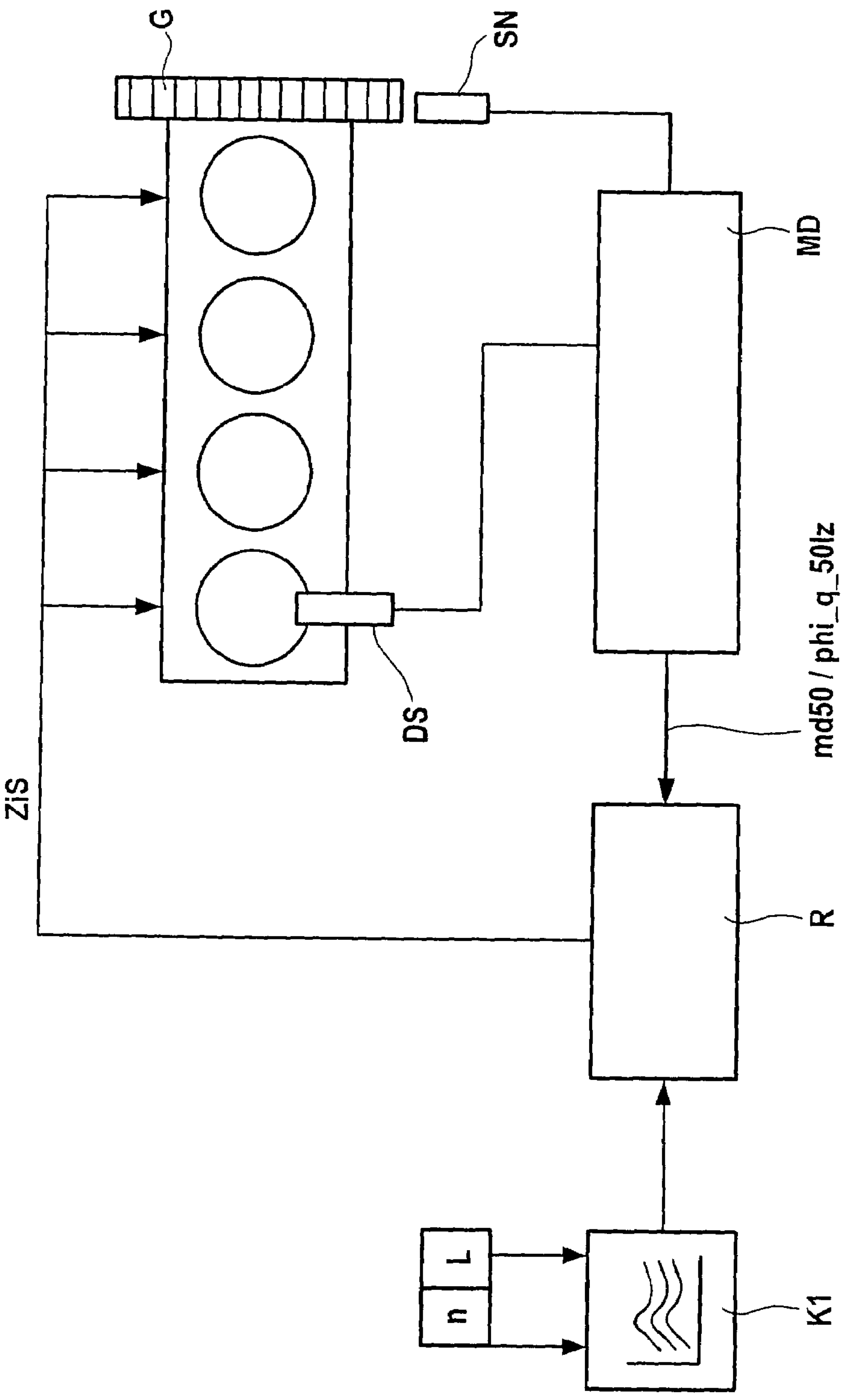
FIG. 4 shows a block diagram of an exemplary embodiment of a method according to the present invention in the case of an indicated cylinder.

An exemplary embodiment of the closed loop control is shown in FIG. 4, using as an example a 4-cylinder engine having a pressure sensor DS and a speed sensor SN which cooperates with a pulse-generating wheel G connected to the crankshaft or camshaft of the internal combustion engine. In the case of V-engines, one guide cylinder is used per bank.

The cylinder-specific features md50 and position feature phi_q50_lz, calculated from the available combustion-chamber pressure of the guide cylinder, are used for controlling the combustion position. Optionally, it may be advantageous to correct the md50 values individually for each cylinder with the aid of a program map K1 which is a function of the operating point and is "taught in" or applied beforehand. In particular, this makes it possible to correct the influence of steady-state torsion effects on the md50 features.

Based on corrected md50 values and the position of the guide cylinder, in block R, cylinder-specific control parameters ZiS like, for example, fuel quantity, start of triggering, moment of ignition, setpoint values for the air path parameters (e.g., EGR rate and/or air mass, which, however, do not take effect individually for each cylinder) and the like are calculated.

The combustion position of the indicated cylinder is controlled on the basis of the feature phi_q50_lz. The resulting associated md50 actual value for the guide cylinder is used in the following as setpoint value for controlling the combustion position of the non-indicated cylinders. The controller amplification parameters for controlling the non-indicated cylinders should be set to be markedly weaker than those for the guide cylinder, in order to temporally decouple these two processes. Optionally—after sufficiently long, steady-state engine operation—the controller outputs for the non-indicated cylinders may be stored as a function of the operating point in a correction program map. During dynamic operation (e.g., sudden load changes), the interventions of the combustion-position controller of the guide cylinder are then transferred to the other cylinders and supplemented by cylinder-specific corrections from the correction program map.

What is claimed is:

1. A method for determining cylinder-specific combustion features of an internal combustion engine, the method comprising:

ascertaining, using a processor arrangement, the cylinder-specific combustion features from a variable which represents a speed of a crankshaft, the cylinder-specific combustion features including: i) a combustion position of at least one cylinder, and ii) a torque of the crankshaft;

wherein the torque is a mean indicated torque over an angular range of a crankshaft angle, wherein the combustion position is determined from a differential gas-torque curve ascertained over the angular range of the crankshaft angle, wherein the differential gas-torque curve is ascertained from the difference between a gas-torque curve and an overrun-torque curve, and wherein the cylinder-specific combustion features are ascertained from a signal of one of a crankshaft sensor and a camshaft sensor.

2. The method as recited in claim 1, wherein the combustion position is determined from a centroid of the differential gas-torque curve ascertained over the angular range of the crankshaft angle.

3. The method as recited in claim 1, wherein the cylinder-specific combustion features are reference input variables of a controller, and a position of injection and total fuel quantity of a cylinder are manipulated variables of the control.

4. A method for determining cylinder-specific combustion features of an internal combustion engine, the method comprising:

ascertaining the cylinder-specific combustion features from a variable which represents a speed of a crankshaft, the cylinder-specific combustion features including: i) a combustion position of at least one cylinder, and ii) a torque of the crankshaft;

wherein the torque is a mean indicated torque over an angular range of a crankshaft angle, wherein the combustion position is determined from a differential gas-torque curve ascertained over the angular range of the crankshaft angle, wherein the combustion position is determined from a centroid of the differential gas-torque curve ascertained over the angular range of the crankshaft angle, wherein the differential gas-torque curve is ascertained from the difference between a gas-torque curve and an overrun-torque curve, and wherein the cylinder-specific combustion features are ascertained from a signal of one of a crankshaft sensor and a camshaft sensor.

5. The method as recited in claim 4, wherein the overrun gas-torque curve is ascertained from a model of the internal combustion engine with the aid of a function, into which are entered at least a charge-air pressure, an ambient pressure, a wall-heat loss and a gas composition in the cylinders.

6. The method as recited in claim 4, wherein the overrun gas-torque curve is stored as a program map.

7. The method as recited in claim 4, wherein the gas-torque curve is ascertained from a total moment of rotational inertia of the crankshaft and a corrected angular speed of the crankshaft.

8. The method as recited in claim 4, wherein parameters which are utilized for determining at least one of the gas-torque curve and the overrun gas-torque curve are adapted based on a deviation of at least one of a gas-torque curve, and an overrun gas-torque curve of one cylinder, which is provided with a device for measuring cylinder pressure, from at least one of a gas-torque curve and an overrun gas-torque curve that was ascertained using the measured cylinder pressure.

9. The method as recited in claim 8, wherein the parameters include at least one of a charge-air pressure, an ambient pressure, a wall-heat loss, and a gas composition in the cylinders.

10. The method as recited in claim 8, wherein the adaptation is carried out using an error-minimization method.

11. The method as recited in claim 10, wherein the error-minimization method is a least square method.

12. The method as recited in claim 8, wherein at least one of the combustion position and the mean indicated torque of the cylinder having the device for measuring the cylinder pressure is checked for plausibility using the measured cylinder pressure.

13. The method as recited in claim 8, wherein a reference gas-torque curve is obtained from the measured cylinder pressure, and differences in the combustion positions of remaining cylinders with respect to the cylinder having the device for measuring the cylinder pressure are determined by cross-correlation of gas-torque curves, determined individually for each cylinder, with the reference gas-torque curve.

14. A control unit for an internal combustion engine, comprising:

an arrangement adapted to determine cylinder-specific combustion features of an internal combustion engine, the cylinder-specific combustion features being ascertained from a variable which represents a speed of a crankshaft from a signal of one of a crankshaft sensor or camshaft sensor, wherein the cylinder-specific combustion features include a combustion position of one cylinder and a torque of the crankshaft, wherein the torque is a mean indicated torque over an angular range of a crankshaft angle, wherein the combustion position is determined from a differential gas-torque curve ascertained over the angular range of the crankshaft angle, wherein the combustion position is determined from a centroid of the differential gas-torque curve ascertained over the angular range of the crankshaft angle, wherein the differential gas-torque curve is ascertained from the difference between a gas-torque curve and an overrun-torque curve, and wherein the cylinder-specific combustion features are ascertained from the signal of one of the crankshaft sensor and the camshaft sensor.

15. An internal combustion engine, comprising:

a control unit adapted to determine cylinder-specific combustion features of an internal combustion engine, the cylinder-specific combustion features being ascertained from a variable which represents a speed of a crankshaft from a signal of at least one of a crankshaft sensor or camshaft sensor, wherein the cylinder-specific combustion features include at least one of a combustion position of one cylinder and a torque of the crankshaft, wherein the torque is a mean indicated torque over an angular range of a crankshaft angle, wherein the combustion position is determined from a differential gas-torque curve ascertained over the angular range of the crankshaft angle, wherein the combustion position is determined from a centroid of the differential gas-torque curve ascertained over the angular range of the crankshaft angle, wherein the differential gas-torque curve is ascertained from the difference between a gas-torque curve and an overrun-torque curve, and wherein the cylinder-specific combustion features are ascertained from the signal of one of the crankshaft sensor and the camshaft sensor.

16. The internal combustion engine as recited in claim 15, wherein at least one cylinder of the engine is provided with a device for measuring the cylinder pressure.

17. The internal combustion engine as recited in claim 16, wherein the device for measuring the cylinder pressure generates a signal that represents the cylinder pressure over time or over the crankshaft angle.

18. A non-transitory computer-readable medium having a computer program, the computer program being executable by a computer, comprising:

a computer program arrangement having program code for performing the following: ascertaining cylinder-specific combustion features from a variable which represents a speed of a crankshaft, the cylinder-specific combustion features including: i) a combustion position of at least one cylinder, and ii) a torque of the crankshaft;

wherein the torque is a mean indicated torque over an angular range of a crankshaft angle, wherein the combustion position is determined from a differential gas-torque curve ascertained over the angular range of the crankshaft angle, wherein the combustion position is determined from a centroid of the differential gas-torque curve ascertained over the angular range of the crankshaft angle, wherein the differential gas-torque curve is ascertained from the difference between a gas-torque curve and an overrun-torque curve, and wherein the cylinder-specific combustion features are ascertained from the signal of one of the crankshaft sensor and the camshaft sensor.

19. A method for determining cylinder-specific combustion features of an internal combustion engine, the method comprising:

ascertaining the cylinder-specific combustion features from a variable which represents a speed of a crankshaft, the cylinder-specific combustion features including: i) a combustion position of at least one cylinder, and ii) a torque of the crankshaft, wherein the torque is a mean indicated torque over an angular range of a crankshaft angle, and wherein the combustion position is determined from a differential gas-torque curve ascertained over the angular range of the crankshaft angle;

wherein the cylinder-specific combustion features are ascertained from a signal of one of a crankshaft sensor or a camshaft sensor, wherein the differential gas-torque curve is ascertained from the difference between a gas-torque curve and an overrun-torque curve, and wherein the overrun gas-torque curve is ascertained from a model of the internal combustion engine with the aid of a function, into which are entered at least a charge-air pressure, an ambient pressure, a wall-heat loss and a gas composition in the cylinders.

20. The method as recited in claim 19, wherein the overrun gas-torque curve is stored as a program map, and wherein the gas-torque curve is ascertained from a total moment of rotational inertia of the crankshaft and a corrected angular speed of the crankshaft.

21. The method as recited in claim 19, wherein parameters which are used for determining at least one of the gas-torque curve and the overrun gas-torque curve are adapted based on a deviation of at least one of a gas-torque curve, and an overrun gas-torque curve of one cylinder, which is provided with a device for measuring cylinder pressure, from at least one of a gas-torque curve and an overrun gas-torque curve that was ascertained using the measured cylinder pressure.

22. The method as recited in claim 21, wherein the parameters include at least one of a charge-air pressure, an ambient pressure, a wall-heat loss, and a gas composition in the cylinders, wherein the adaptation is carried out using an error-minimization method, wherein at least one of the combustion position and the mean indicated torque of the cylinder having the device for measuring the cylinder pressure is checked for plausibility using the measured cylinder pressure.

23. The method as recited in claim 21, wherein a reference gas-torque curve is obtained from the measured cylinder pressure, and differences in the combustion positions of remaining cylinders with respect to the cylinder having the device for measuring the cylinder pressure are determined by cross-correlation of gas-torque curves, determined individually for each cylinder, with the reference gas-torque curve.

24. The method as recited in claim 21, wherein the cylinder-specific combustion features are reference input variables of a controller, and a position of injection and total fuel quantity of a cylinder are manipulated variables of the control.

* * * * *